United States Patent [19]
Aufrere et al.

[11] Patent Number: 5,697,674
[45] Date of Patent: Dec. 16, 1997

[54] VEHICLE SEAT HAVING A SEAT PROPER THAT IS ADJUSTABLE IN HEIGHT

[75] Inventors: Christophe Aufrere, Marcoussis; Bruno Hamelin, Combs la Ville, both of France

[73] Assignee: Bertrand Faure Equipements S.A., Boulogne, France

[21] Appl. No.: 699,696

[22] Filed: Aug. 19, 1996

[30] Foreign Application Priority Data

Aug. 18, 1995 [FR] France ............................ 95 09932

[51] Int. Cl.⁶ .................................................. A47C 1/02
[52] U.S. Cl. ........................ 297/344.15; 297/344.13; 297/284.2; 297/452.52
[58] Field of Search ................ 297/344.15, 344.12, 297/344.14, 284.2, 344.1, 344.13, 284.1, 425.48, 452.49, 452.52, 452.18; 248/157, 419, 429

[56] References Cited

U.S. PATENT DOCUMENTS

| | | | |
|---|---|---|---|
| 4,556,185 | 12/1985 | Takagi | 297/344.15 X |
| 4,606,532 | 8/1986 | Kazaoka et al. | 297/452.52 X |
| 4,702,522 | 10/1987 | Vail et al. | 297/284.2 X |
| 4,712,834 | 12/1987 | Warrick | 297/284.2 |
| 4,828,213 | 5/1989 | Saito et al. | 297/344.14 X |

FOREIGN PATENT DOCUMENTS

| | | |
|---|---|---|
| 0 235 793 | 9/1987 | European Pat. Off. . |
| 0 577 517 | 1/1994 | European Pat. Off. . |
| 912 187 | 8/1946 | France . |
| 31 34 287 | 3/1983 | Germany . |

*Primary Examiner*—Milton Nelson, Jr.
*Attorney, Agent, or Firm*—Larson & Taylor

[57] ABSTRACT

A vehicle seat has a cushion supported by a suspension web extending within a rigid frame. The suspension web is elastically deformable in traction in a longitudinal direction and it is fixed to the frame at one of its longitudinal ends, while its other longitudinal end is fixed to a portion of a raising mechanism enabling the height of the seat proper to be adjusted by the user acting directly on the seat proper. The suspension web exerts traction on the raising mechanism that urges the seat proper upwards.

10 Claims, 3 Drawing Sheets

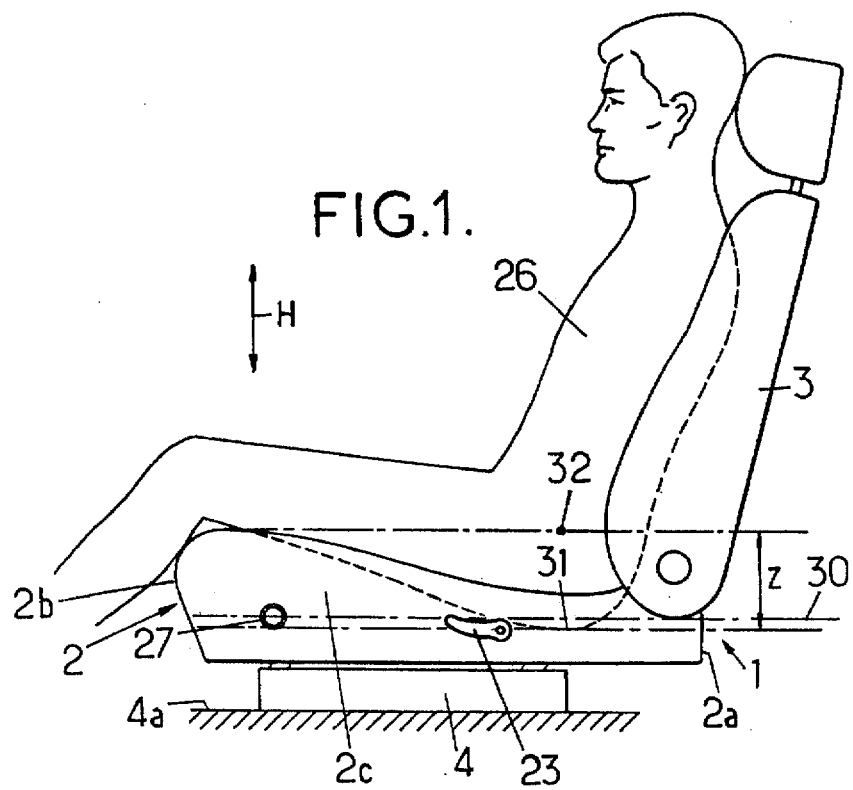
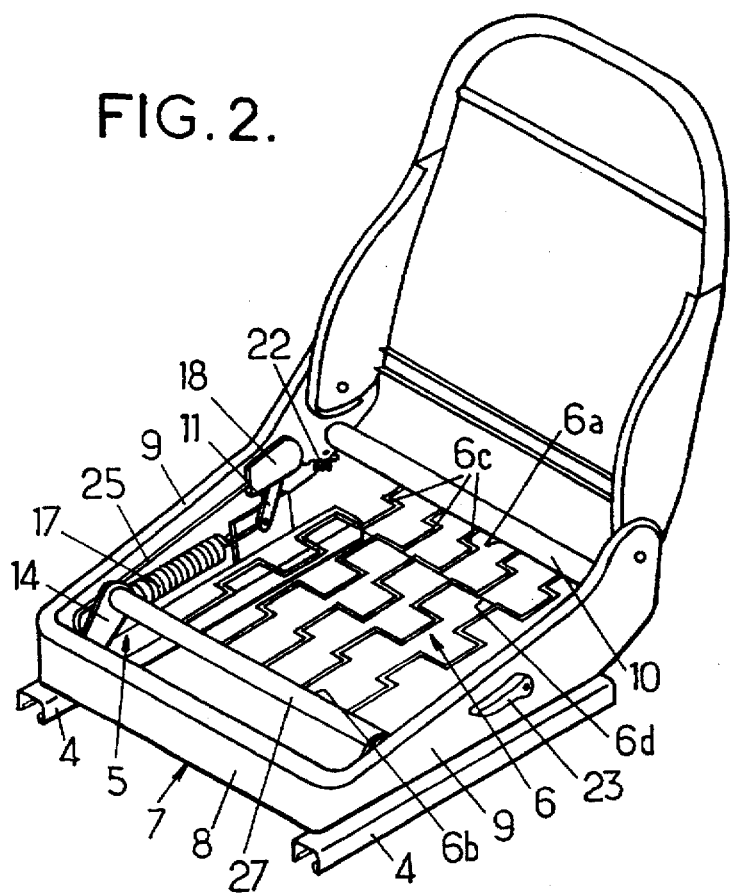
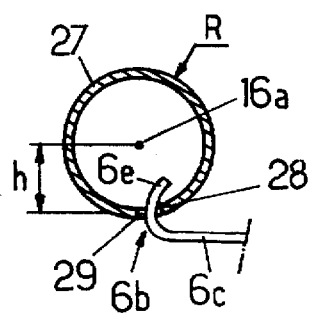

5,697,674

VEHICLE SEAT HAVING A SEAT PROPER THAT IS ADJUSTABLE IN HEIGHT

FIELD OF THE INVENTION

The present invention relates to vehicle seats having seats proper that are adjustable in height.

Of such vehicle seats, the invention relates more particularly to those comprising a seat back and a seat proper which extends in a "longitudinal" direction between a rear end close to the seat back and a front end remote therefrom, said seat proper including a seat cushion supported by a substantially horizontal suspension web which is disposed within a rigid frame that is likewise substantially horizontal, the suspension web extending in the longitudinal direction between first and second ends, the first end being fixed to the rigid frame, and the suspension web being elastically deformable in traction at least in the longitudinal direction, the rigid frame being supported by a raising mechanism which is controlled by the user acting directly on the seat proper to move the seat upwards and downwards, said raising mechanism being provided with a locking device that is actuatable by the user to lock and unlock said raising mechanism, and the raising mechanism further including an assistance device which urges the seat proper upwards to assist the user in adjusting the height of the seat proper.

BACKGROUND OF THE INVENTION

The assistance device in question is in general constituted by a pair of helical springs which exert a traction force on certain portions of the raising mechanism to urge the seat proper upwards.

These helical springs are dimensioned substantially to compensate the average weight of a user. Thus, a user of average weight can adjust the height of the seat without effort, and in particular can easily raise the seat, when necessary by slightly reducing his or her own weight on the seat by leaning on the steering wheel or some other support point in the vehicle.

However, actuating the lifting mechanism becomes more difficult when the user is of a weight that is far from the above-mentioned average weight.

In particular, when the user is very heavy, he or she will need to exert a relatively large amount of lifting force in order to allow the seat proper to rise.

OBJECT AND BRIEF SUMMARY OF THE INVENTION

A particular object of the present invention is to mitigate these drawbacks.

To this end, the invention provides a vehicle seat of the kind in question in which the raising mechanism includes at least one "web-support" portion fixed to the second end of the suspension web, said web-support portion moving vertically and substantially following the movement of the seat proper when the height thereof is adjusted, while simultaneously moving the second end of the suspension web away from the first end thereof when the seat is moved downwards and moving the second end of the suspension web towards the first end thereof when the seat is moved upwards, the suspension web exerting a traction force on the web-support portion of the raising mechanism, which force is relayed to the raising mechanism as a whole, urging the seat proper upwards.

Thus, use is made of the weight of the user, which is taken up for the most part by the suspension web, to add to the action of the conventional assistance device.

In this way, the force tending to raise the seat proper when the locking device is released, matches the weight of the user sitting on the seat.

In particular, the heavier the user, the larger the force exerted by the suspension web on the raising mechanism for lifting the seat.

In preferred embodiments, use is also made of one or more of the following dispositions:

- the raising mechanism includes four links which are organized as a pair of front links and a pair of rear links, and which pivot in vertical planes parallel to the above-mentioned longitudinal direction when the raising mechanism is actuated, the two links of each pair of links being supported by respective bottom pivots sharing a common pivot axis, and said two links being respectively connected to the rigid frame by means of top pivots which likewise share a common pivot axis, the raising mechanism further including a substantially rigid support member which extends across the seat between two ends respectively secured to the two links of one of the two pairs of links, said support member comprising the above-mentioned web-support portion, and said web-support portion being offset a certain distance from the common pivot axis of the top pivots of the two links connected to the support member, said offset being so directed that the second end of the suspension web moves towards its first end when the seat proper is moved upwards, and that said second end moves away from said first end when the seat proper is moved downwards; thus, the support member also serves as a coupling member enabling the two links of the pair of links in question to be synchronized;
- the web-support portion is offset by at least 10 mm from the common axis of the top pivots of the two links which are connected to the support member;
- the web-support portion is disposed in a horizontal plane which is vertically offset from the common pivot axis of the top pivots of the two links connected to the support member by a height that is always greater than 8 mm while the height of the seat proper is being adjusted;
- the support member is a substantially rectilinear metal bar;
- the metal bar constituting the support member is tubular and of circular section centered on the common connected to said bar; in this way, during pivoting of the support member with the links of the raising mechanism, the support member does not interfere with the seat cushion or with any other portion of the seat proper;
- the support member is secured to the two front links, the respective top pivots of these two front links moving rearwards relative to the bottom pivots of said front links when the seat proper is moved downwards, and the web-support portion being disposed substantially in a horizontal plane situated beneath the common pivot axis of said two front links;
- the support member is a strong rigid metal bar secured to the two front links and situated, when a user is sitting on the seat, in front of the user's buttocks in a horizontal plane disposed above said buttocks; in this manner, in the event of the vehicle being involved in a front impact accident, the support member contributes to preventing the user of the seat tending to be thrown forwards by passing beneath the lap portion of the safety belt because of the seat cushion being squashed ("submarining"); optionally and preferably, these dispositions can be used in isolation, i.e. with a suspension web whose two longitudinal ends are fixed to the rigid frame and not to the support member, the support member then merely constituting a cross member serving firstly to synchronize the two front links and secondly to avoid the "submarining" phenomenon, and the suspension web not acting on the raising mechanism;

the horizontal plane of the support member when a user is sitting on the seat is situated beneath the heads of the user's femurs; and the suspension web includes metal wires which extend longitudinally between the front and back ends of said suspension web and which are bent in a common horizontal plane, the metal wires thus being elastically deformable in traction in the longitudinal direction.

BRIEF DESCRIPTION OF THE DRAWINGS

Other characteristics and advantages of the invention appear from the following detailed description of embodiments, given as non-limiting examples, and with reference to the accompanying drawings.

In the drawings:

FIG. 1 is a diagrammatic side view showing a seat constituting an embodiment of the invention;

FIG. 2 is a perspective view showing the framework of the FIG. 1 seat;

FIG. 6 is a detail view showing how the suspension web of the seat shown in FIGS. 1 to 5 is hooked to the tube coupled to the two front links of the raising mechanism of said seat.

MORE DETAILED DESCRIPTION

Figure 3:
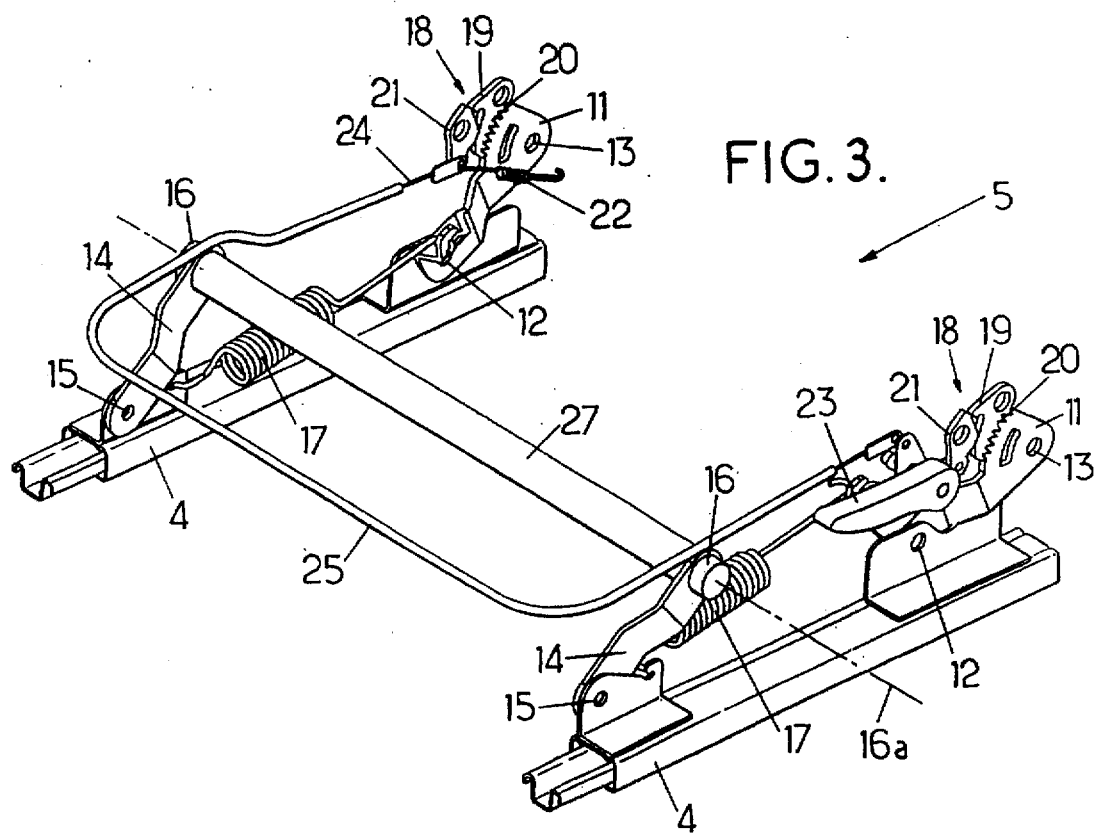
FIG. 3 is a perspective view showing the raising mechanism of the FIG. 1 seat.

In the various figures, the same references designate elements that are identical or similar.

As shown diagrammatically in FIG. 1, the invention relates to a vehicle seat 1, in particular a front seat for a motor vehicle.

The seat comprises both a seat proper 2 which extends in a "longitudinal" direction between a rear end 2a and a front end 2b, and a seat back 3 which is generally pivotally mounted relative to the seat proper.

The seat proper 2 is supported by a raising mechanism 5 (FIGS. 2 to 5) which is in turn mounted on longitudinal sliders 4 themselves fixed to the floor 4a of the vehicle. In this manner, the position of the seat proper can be adjusted both longitudinally in the forwards or rearwards direction by longitudinal sliding of the sliders 4, and vertically by being lifted or lowered in the vertical direction H.

The seat proper 2 essentially comprises a seat cushion 2c supported by a suspension web 6 that is substantially horizontal and disposed within a rigid frame 7 that is itself substantially horizontal.

In the example shown in the drawings, the frame 7 comprises:

a front 8;

two sides 9 formed together with the front out of a single piece of folded sheet metal; and a back formed by a metal tube 10 or some other metal bar, which is welded to the rear ends of the two sides 9 of the frame.

The rear end 6a of the suspension web is fixed to the metal tube 10 while the front end 6b of the web is fixed to a tube 27 which is described below.

The suspension web 6 is conventionally constituted by metal wires 6c extending longitudinally between the rear end 6a and the front end 6b, and which may be interconnected transversely by flexible ties 6d, only one of which is shown in FIG. 2 for greater clarity. These metal wires 6c are bent to form crenellations or waves in a common horizontal plane, such that the wires 6c are elastically deformable in traction in the longitudinal direction.

The particular raising mechanism 5 shown in the drawings and seen most clearly in FIG. 3 comprises, in conventional manner:

two rear links 11 disposed on either side of the seat and each pivotally mounted on the corresponding slider 4 by means of a bottom pivot 12, and pivotally connected to the corresponding frame side 9 by means of a top pivot 13, the two bottom pivots 12 having a common pivot axis and the two top pivots 13 likewise having a common pivot axis; and two front links 14 disposed on either side of the seat and each connected firstly to the corresponding slider 4 by means of a bottom pivot 15 and secondly to the corresponding frame side 9 by means of a top pivot 16, the two bottom pivots 15 having a common pivot axis and the two top pivots 16 also having a common pivot axis 16a.

The four links 11 and 14 pivot in vertical planes that are parallel to the longitudinal direction.

Figure 4:
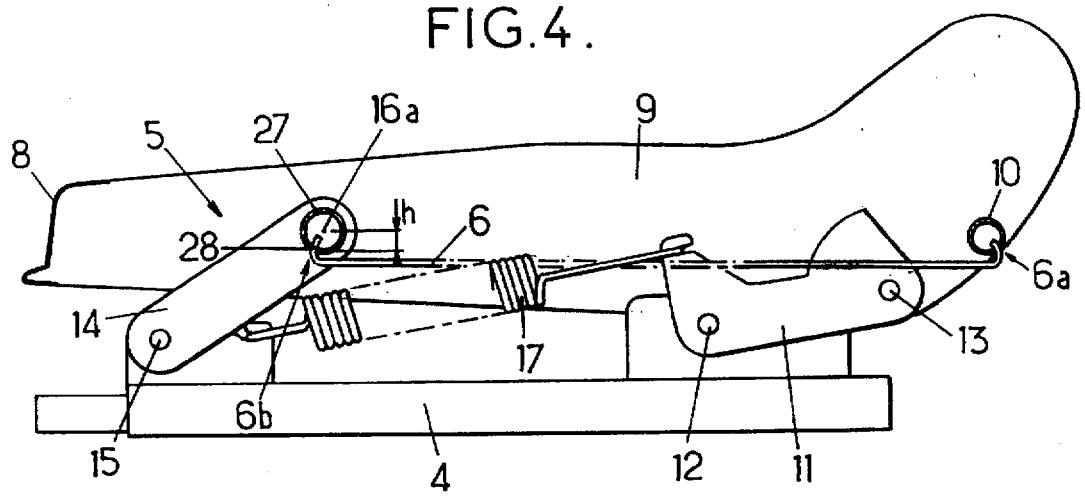
FIG. 4 is a diagrammatic view in vertical longitudinal section of the FIG. 1 seat, with the seat proper being in its low position.
Figure 5:
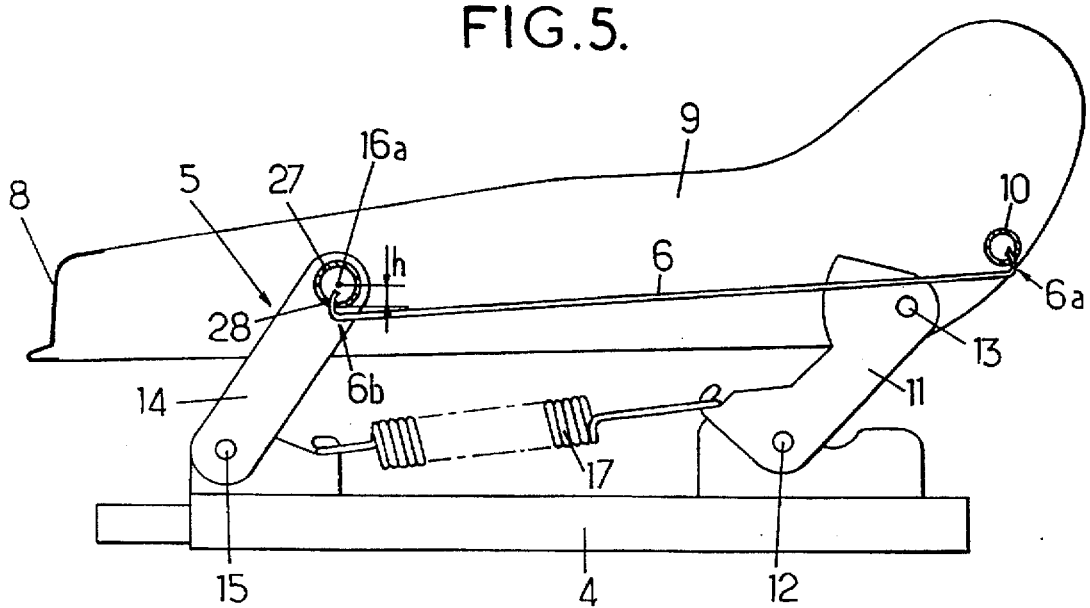
FIG. 5 is a view similar to FIG. 4, with the seat proper in its high position.

Also, in the embodiment described, the links 11 and 14 slope upwards and backwards from their respective bottom pivots, with the links being relatively little inclined relative to the horizontal when the seat proper is in its lowest position, as shown in FIG. 4, and said links being more steeply inclined relative to the horizontal, i.e. being closer to the vertical, when the seat proper 2 is lifted to its highest position, as shown in FIG. 5.

The raising mechanism also includes an assistance device which, in the embodiment shown, is constituted by two helical springs 17. Each of these springs 17 is connected at one end on a slider 4 and at its other end to a bottom portion of the corresponding rear link 11, exerting a traction force on the rear link that tends to lift said link. Thus, the springs 17 urge the seat proper 2 upwards, compensating, at least in part, for the weight of a user 26 (FIG. 1) sitting on the seat 1.

When the seat is in normal use, i.e. after the vertical position of the seat proper 2 has been adjusted, the raising mechanism 5 is locked by a locking device 18.

In the embodiment shown in FIG. 3, the locking device preferably comprises, on either side of the seat, a toothed latch 19 which co-operates with a corresponding toothed sector 20 belonging to the rear link 11 situated on the same side of the seat.

The latch 19 is pivotally mounted on the corresponding frame side 9 to pivot between a locking position where it prevents the rear link 11 from moving and a retracted position where it allows said link to pivot.

A cam 21 which is preferably pivotally mounted on the same frame side 9 is urged resiliently towards the latch 19 by a spring 22 secured to the frame 7, and placing the latch 19 in its locking position.

This cam 21 can be moved away from the latch 19, thereby allowing the latch to take up its retracted position. For this purpose, the cam 21 is controlled by a lever 23 which is accessible to the user 26 of the seat. The lever 23 is connected to both cams 21 by means of rodding or cables. The Bowden cable shown in FIG. 3 comprises a wire 24 mounted to slide in a sheath 25 which is fixed to the frame 7 of the seat proper.

When the locking device 18 is unlocked, the user 26 of the seat can adjust the height of the seat proper 2 by acting directly thereon: the seat proper then moves relatively slowly upwards or downwards as a function of the weight of the user and also as a function of the traction or thrust forces exerted by the user on the steering wheel of the vehicle.

In order to minimize the forces in question exerted by the user when adjusting the height of the seat proper, particularly when the user's weight is relatively far from the average weight for which the springs 17 are dimensioned, the weight of the user is also compensated by the action of the suspension web 16 on the raising mechanism.

To this end, at the front end 6b of the suspension web 6, the metal wires 6c constituting said web are fixed along a fastening line 28 to a bottom portion of the above-mentioned tube 27 which extends horizontally between two ends that are secured respectively to said two front links 14. The tube 27 is a rigid metal tube having relatively high twisting and bending strength. The tube is rectilinear in shape and circular in section, and it is preferably centered on the common pivot axis 16a of the top pivots 16 of the two front links.

The suspension web 6 can be fastened to the tube 27 in conventional manner by inserting the front ends 6e of the metal wires 6c which are bent upwards to form hooks, in holes 29 formed through the tube 27 along the fastening line 28.

The suspension web 6 then exerts a traction force on the bottom portion of the tube 27 with the point of application of said force being offset downwards from the pivot axis 16a, such that said traction force tends to rotate to the tube 27 and the front link 14 in the direction for displacing the seat proper 2 upwards.

The heavier the user 26 sitting on the seat, the greater this traction force, and as a result the upwards force to which the seat proper 2 is subjected is itself adapted, at least in part, to the weight of the user 26.

In order to transform the traction force of the suspension web 6 effectively into a force urging the seat proper 2 upwards, the outside radius R of the tube 27 is preferably at least 10 mm, e.g. being about 12.5 mm, and the vertical height h between the pivot axis 16a and the fastening line 28 is preferably greater than 8 mm in all positions of the seat proper 2, said height h being greater than 10 mm, for example.

Preferably, when the user is sitting on the seat, the tube 27 occupies a mean horizontal plane 30 which lies in a vertical range Z situated above the user's buttocks 31 and preferably below the heads 32 of the user's femurs (the joints between the femurs and the pelvis).

In this manner, when the vehicle suffers a front impact in an accident, the tube 27 contributes to preventing "submarining", i.e. the user 26 being thrown forwards, passing between the lap portion of the safety belt and the squashed front portion of the seat cushion 2c.

Also, in the embodiment described above, the rigid tube 27 serves to ensure that the left and right portions of the raising mechanism 5 are accurately synchronized.

Figure 7:
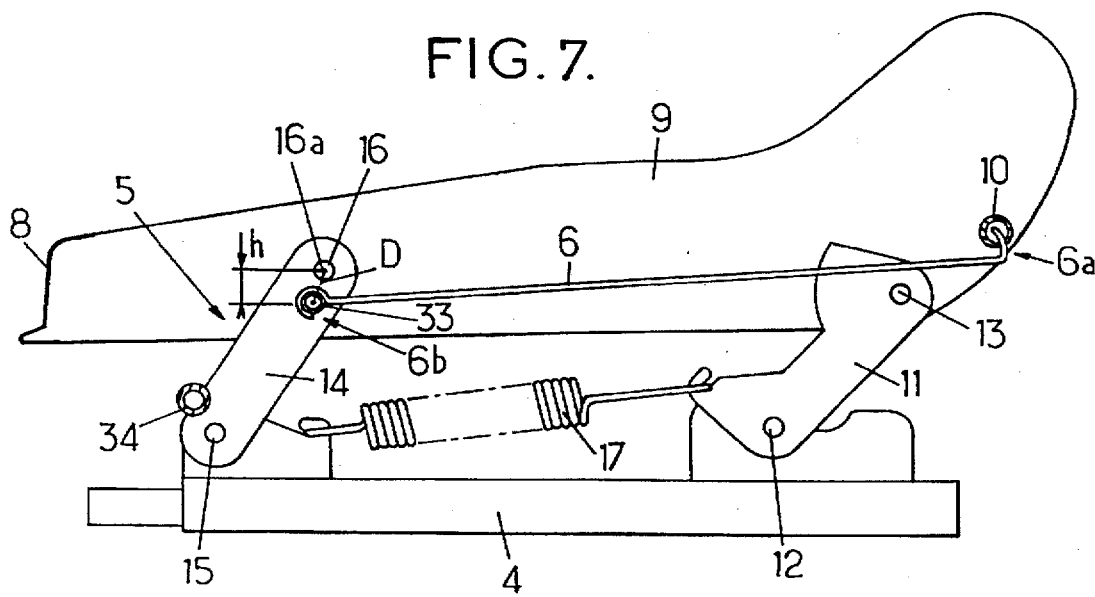
FIG. 7 is a view similar to FIG. 5 showing another embodiment of the seat of the invention.

In the variant shown in FIG. 7, the seat differs from the seat of FIGS. 1 to 6 solely by the following points:

the tube 27 is replaced by a metal rod 33 of relatively small section, that is rigid and rectilinear, having the front end 6b of the suspension web 6 fixed thereto, the rod 33 extends horizontally between two ends which are respectively fixed to the two front links 14 beneath the common pivot axis 16a of the top pivots of said front links, the central axis of the rod 33 being offset from said axis 16a by a distance D which may have the same values as those defined above for the radius R of the tube 27, said central axis being offset from said axis 16a by a vertical height h which may also have the same values as those defined above, and the rod 33 may optionally have little twisting and bending strength, in which case the rod no longer serves to prevent "submarining", nor does it serve to synchronize accurately the movements of the right and left portions of the raising mechanism; and preferably a strong coupling bar 34 fixed rigidly to the two front links 14 (or optionally to the two back links 11), e.g. towards the bottom ends of the links, so as to synchronize properly the movements of the right and left portions of the raising mechanism.

The invention is not limited to the embodiments described above; on the contrary, it extends to any variants thereof, and in particular those in which:

the tube 27 or the rod 33 is not rectilinear;

the metal tube 27 is replaced by a rigid metal bar of non-tubular section or of section that is tubular but not circular;

the links 11 and 14 are mounted so as to tilt forwards to lower the seat proper 2, with the front end 6b of the suspension web then being secured to its support member along a fastening line which is offset upwards from the common pivot axis of the top pivot of the two front links;

the rear end 6a of the suspension web 6 is fixed to a support member secured to the two rear links 11, while the front end 6b of the suspension web is secured to the frame 7 of the seat, the rear end 6a being secured to its support member along a fixing line which is offset upwards from the common pivot axis of the top pivots of the rear links, the rear links tilting rearwards to lower the seat proper 2; and the rear end 6a of the suspension web 6 is fixed to a support member secured to both rear links 11, while the front end 6b of the suspension web is secured to the frame 7 of the seat, the rear end 6a being secured to its support member along a fastening line which is offset downwards relative to the common pivot axis of the top pivots 13 of the rear links, said rear links tilting forwards to lower the seat proper 2.

We claim:

1. A vehicle seat comprising a seat back and a seat proper which extends in a longitudinal direction between a rear end close to the seat back and a front end remote therefrom, said seat proper including a seat cushion supported by a substantially horizontal suspension web which is disposed within a rigid frame that is likewise substantially horizontal, the suspension web extending in the longitudinal direction between first and second ends, the first end being fixed to the rigid frame, and the suspension web being elastically deformable in traction at least in the longitudinal direction, the rigid frame being supported by a raising mechanism which is controlled by a user of the seat acting directly on the seat proper to move the seat upwards and downwards, said raising mechanism being provided with a locking device that is actuatable by the user to lock and unlock said raising mechanism, and the raising mechanism further including an assistance device which urges the seat proper upwards to assist the user in adjusting the height of the seat proper, wherein the raising mechanism includes at least one web-support portion fixed to the second end of the suspension web, said web-support portion moving vertically and substantially following the movement of the seat proper when the height thereof is adjusted, while simultaneously moving the second end of the suspension web away from the first end thereof when the seat is moved downwards and moving the second end of the suspension web towards the first end thereof when the seat is moved upwards, the suspension web exerting a traction force on the web-support portion of the raising mechanism, which force is relayed to the raising mechanism as a whole, urging the seat proper upwards.

2. A seat according to claim 1, in which the raising mechanism includes four links which are organized as a pair of front links and a pair of rear links, and which pivot in vertical planes parallel to the above-mentioned longitudinal direction when the raising mechanism is actuated, the two links of each pair of links being supported by respective bottom pivots sharing a common pivot axis, and said two links being respectively connected to the rigid frame by means of top pivots which likewise share a common pivot axis, the raising mechanism further including a substantially rigid support member which extends across the seat between two ends respectively secured to the two links of one of the two pairs of links, said support member comprising the above-mentioned web-support portion, and said web-support portion being offset a certain distance from the common pivot axis of the top pivots of the two links connected to the support member, said offset being so directed that the second end of the suspension web moves towards its first end when the seat proper is moved upwards, and that said second end moves away from said first end when the seat proper is moved downwards.

3. A seat according to claim 2, in which the web-support portion is offset by at least 10 mm from the common axis of the top pivots of the two links which are connected to the support member.

4. A seat according to claim 3, in which the web-support portion is disposed in a horizontal plane which is vertically offset from the common pivot axis of the top pivots of the two links connected to the support member by a height that is always greater than 8 mm while the height of the seat proper is being adjusted.

5. A seat according to claim 2, in which the support member is a substantially rectilinear metal bar.

6. A seat according to claim 5, in which the metal bar constituting the support member is tubular and of circular section centered on the common pivot axis of the top pivots of the two links which are connected to said bar.

7. A seat according to claim 2, in which the support member is secured to the two front links, the respective top pivots of these two front links moving rearwards relative to the bottom pivots of said front links when the seat proper is moved downwards, and the web-support portion being disposed substantially in a horizontal plane situated beneath the common pivot axis of said two front links.

8. A seat according to claim 2, in which the support member is a strong rigid metal bar secured to the two front links and situated, when a user is sitting on the seat, in front of the user's buttocks in a horizontal plane disposed above said buttocks.

9. A seat according to claim 8, in which the horizontal plane of the support member when a user is sitting on the seat is situated beneath the heads of the user's femurs.

10. A seat according to claim 2, in which the suspension web includes metal wires which extend longitudinally between the front and back ends of said suspension web and which are bent in a common horizontal plane, the metal wires thus being elastically deformable in traction in the longitudinal direction.

* * * * *